Figure 8:
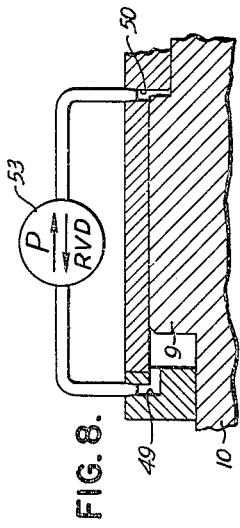

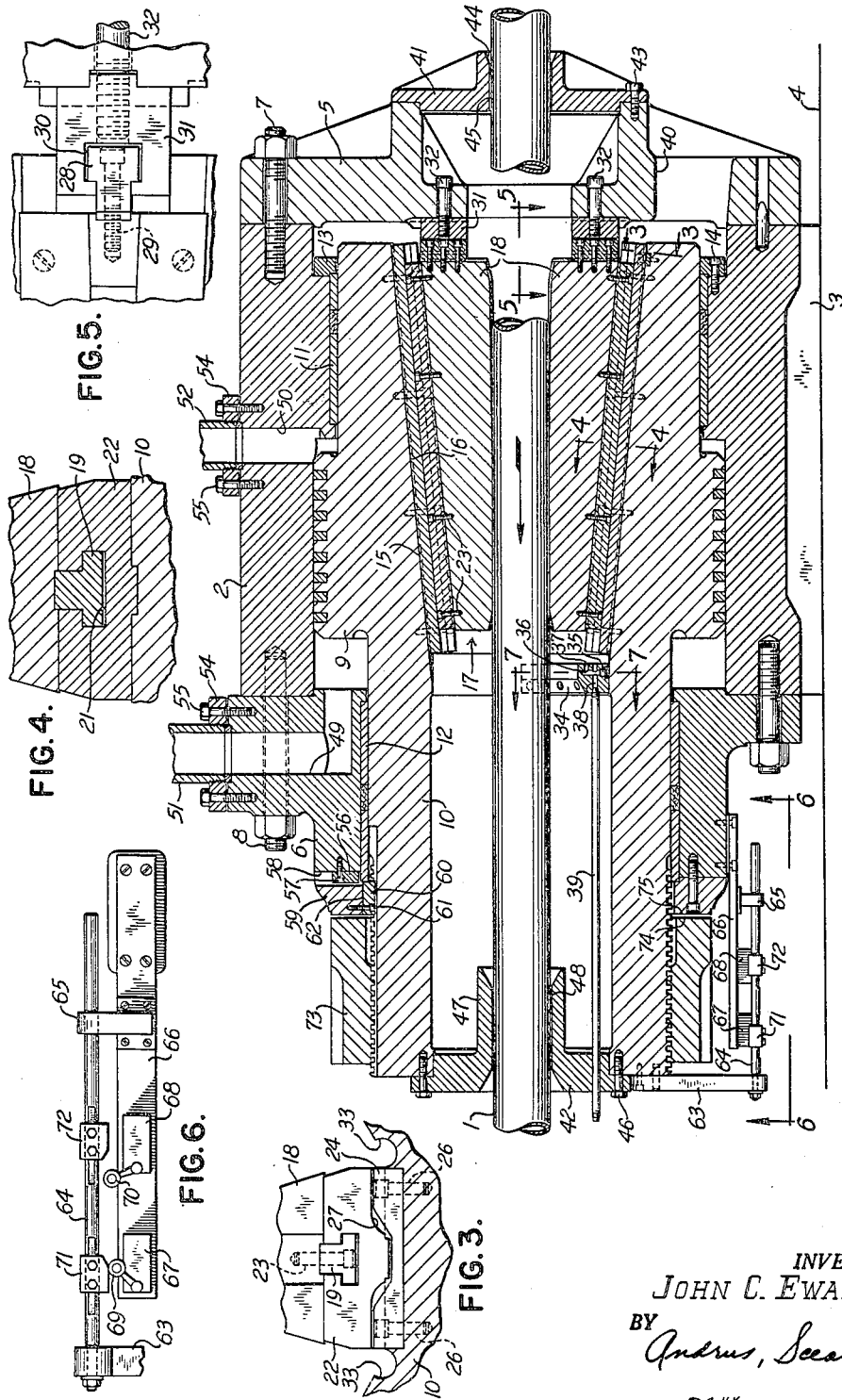

Sept. 12, 1961  J. C. EWART  2,999,405
APPARATUS FOR RADIALLY COMPRESSING ARTICLES
Filed Dec. 24, 1957  3 Sheets-Sheet 2

INVENTOR.
JOHN C. EWART
BY
Andrus, Sceales & Starke
Attorneys

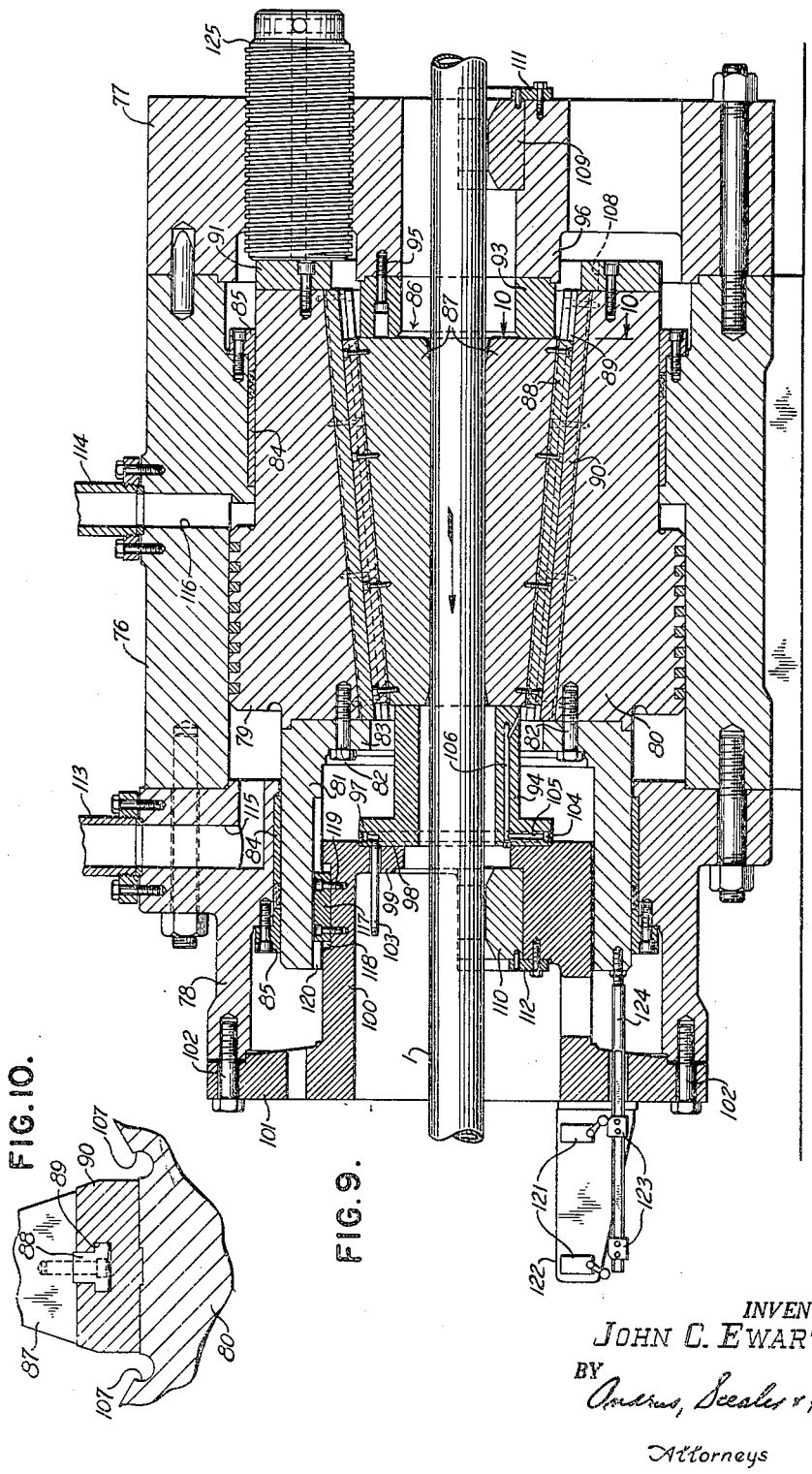

United States Patent Office 2,999,405
Patented Sept. 12, 1961

2,999,405
APPARATUS FOR RADIALLY COMPRESSING ARTICLES
John C. Ewart, Milwaukee, Wis., assignor to A. O. Smith Corporation, Milwaukee, Wis., a corporation of New York
Filed Dec. 24, 1957, Ser. No. 704,926
7 Claims. (Cl. 78—14)

This invention relates to an apparatus for radially compressing articles and more particularly to an apparatus for sizing relatively large diameter pipe to increase the mechanical properties of the pipe.

Casing pipe, which is to be used as oil well casing or the like, is generally cold sized or decreased in diameter to increase the mechanical properties of the pipe, particularly the compressive strength, so that the casing pipe will have increased resistance to collapse.

The conventional methods of cold sizing casing pipe consist of either compressing the pipe between two die segments or halves, each of which has a generally semicircular shape, or alternately, by rolling the pipe between a plurality of rolls located at the cardinal points of the pipe. It has been found that cold sizing of the pipe by these methods does not produce a uniform compressive strength throughout the entire periphery of the pipe due to the fact that the force applied to the pipe is not uniform throughout the entire circumference of the pipe.

The present invention is directed to an apparatus for radially compressing a tubular article by exerting a force against the outer surface of the article through a series of radially expandable and contractable die segments. This construction enables a substantially uniform force to be exerted on the entire periphery of the article and results in the article having a more uniform compressive strength.

According to the invention, the radial compression apparatus consists of a hollow die assembly having a central opening to receive the pipe or other tubular article to be cold sized. The die assembly is formed of a plurality of circumferentially disposed die segments which are adapted to move radially inward to exert a force against the outer surface of the pipe.

The die segments are moved inwardly against the pipe by a tapered mandrel or wedge block which is disposed around the die assembly. The mandrel is formed integrally with a piston of a hydraulic cylinder, and by introducing hydraulic fluid into the cylinder, the piston is moved therein to thereby correspondingly move the tapered mandrel and force the die segments against the pipe.

After an increment of length of the pipe is sized or reduced in diameter, the die assembly is expanded through operation of the piston and the pipe is then advanced to position a second increment of the pipe within the die assembly. This procedure is continued until the entire length of the pipe has been reduced in diameter or cold sized.

The present apparatus has considerably less moving parts than the conventional sizing apparatus and thereby not only reduces the initial cost of the apparatus but also substantially reduces the maintenance expense.

As the apparatus is considerably lighter in weight than other sizing apparatus, it can be more readily moved or transported and the supporting structure or foundation can be reduced in size.

The apparatus of the invention produces a more accurately sized pipe due to the fact that a large number of die segments act simultaneously against the entire periphery of the pipe as opposed to a conventional sizing apparatus in which only two, or perhaps four elements, act against the outer surface of the pipe.

In addition, a straighter pipe is produced because the sizing operation is done simultaneously on a length of approximately 24 inches, instead of sizing or compressing a pipe on a line contact as is the case of pressure rolls.

Other objects and advantages of the invention will appear in the course of the following description.

The drawings illustrate the best mode presently contemplated of carrying out the invention.

Figure 7:
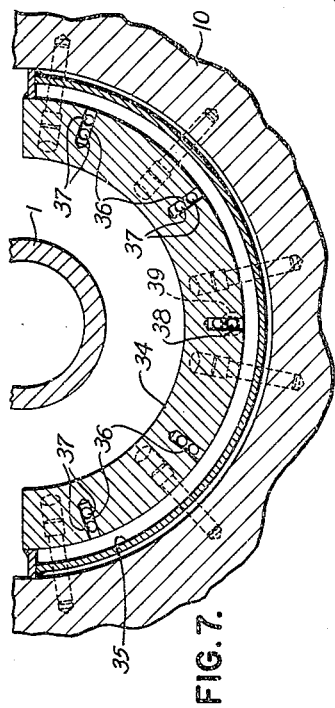
Figure 2:
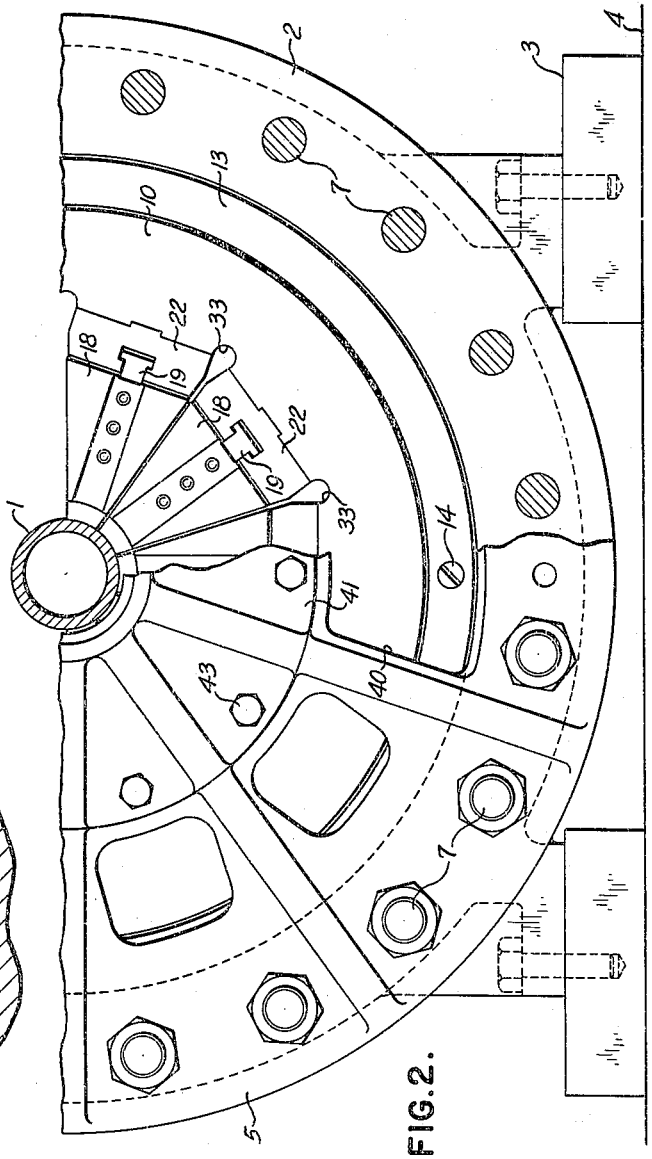

In the drawings:

FIGURE 1 is a vertical section of the sizing apparatus of the invention;
FIG. 2 is a fragmentary end view of the apparatus with parts broken away in section;
FIG. 3 is a view taken along line 3—3 of FIGURE 1;
FIG. 4 is a view taken along line 4—4 of FIGURE 1;
FIG. 5 is a view taken along line 5—5 of FIGURE 1;
FIG. 6 is a view taken along line 6—6 of FIGURE 1;
FIG. 7 is a view taken along line 7—7 of FIGURE 1;
FIG. 8 is a diagrammatic representation of the pumping system;
FIG. 9 is a vertical section of a modified form of the invention; and
FIG. 10 is a view taken on line 10—10 of FIG. 9.

The drawings illustrate an apparatus for cold sizing a relatively large diameter pipe 1 in a series of incremental operations. The apparatus consists of an outer cylinder 2 supported on a base 3 which rests on foundation 4.

The forward end of cylinder 2 is enclosed by an annular head 5 and the rearward end of the cylinder is similarly enclosed by a head 6. Heads 5 and 6 are provided with axial openings to receive the pipe 1 and are secured to the respective ends of the cylinder 2 by means of bolts 7 and 8, respectively.

A piston 9 is slidably disposed within the cylinder 2 and is formed integrally with a hollow mandrel 10. The mandrel is guided in longitudinal movement by a pair of bearing assemblies 11 and 12. The bearing assembly 11 is disposed within a suitable recess formed in the inner surface of the cylinder 2 and is secured therein by a retaining ring 13. Bolts 14 extend through the ring 13 and are threaded into the end of cylinder 2. The bearing assembly 12 is secured within a suitable recess formed in the inner surface of the rear cylinder head 6.

The inner surface 15 of mandrel 10 is tapered longitudinally to provide a wedge which acts against the outer tapered surface 16 of an annular die assembly 17 to expand or contract the same. The die assembly 17 is formed of a series of circumferentially disposed die segments 18 and is provided with an axial opening to receive the pipe 1 to be cold sized. As the piston 9 and mandrel 10 are moved forwardly toward cylinder head 5, the die segments 18 are contracted and exert a force against the outer surface of the pipe 1 to compress the same in diameter. Conversely, when the piston 9 and mandrel 10 are moved rearwardly toward the rear cylinder head 6, the die segments 18 are expanded and moved out of engagement with the pipe 1.

To maintain the die segments in proper alignment and to guide the mandrel in reciprocating movement, the mandrel 10 is longitudinally keyed to the die assembly 17. A key 19 is attached by bolts 23 to the outer surface of each die segment 18 and cooperates with a keyway 21 formed in the corresponding guide block 22 which is secured to the surface 15 of mandrel 10 by bolts 23. The keys 19 and cooperating keyways 21 serve to prevent relative rotation between the die segments 18 and the mandrel 10 and assure proper alignment during the reciprocating motion of the mandrel 10.

As an added measure to prevent longitudinal movement between guide blocks 22 and mandrel 10, a plurality of keys 24 are secured within transverse recesses formed in the inner surface 15 of mandrel 10 by bolts 26. The inner edge of each key 24 is received within a groove 27 formed in the corresponding guide block 22. The keys 24 function to lock the guide blocks to the mandrel.

To guide the die segments 18 in radial movement and prevent the die segments from moving rearwardly with the mandrel 10, the die segments are keyed to the forward cylinder head 5. A key 28 is secured by bolts 29 to the end of each die segment 18 and the keys 28 cooperate with keyways 30 formed in key ring 31. The key ring 31 is secured within a shoulder formed on the inner surface of cylinder head 5 adjacent the axial opening therein by a plurality of bolts 32. The keys 28 and cooperating keyways 30 prevent the die assembly 17 from moving rearwardly with the mandrel 10 and piston 9 on the return stroke of the piston as the die assembly is expanded and also guide the die segments in radial movement during expansion and contraction of the die assembly.

As mill scale and other foreign matter is apt to accumulate between the die segments 18 and interfere with the expansion and contraction thereof, a means is provided for flushing the die segments of foreign material. As best shown in FIGS. 2 and 3, a plurality of longitudinally extending troughs 33 are formed in the inner surface of the mandrel 10 between the segments 18 in the lower half of the die assembly. The mill scale and other foreign material collects within the troughs 33 and is flushed from the troughs by water or other cleansing medium. To introduce the water into the trough 33, a manifold 34 is secured within the mandrel 10 at the rear end of the tapered surface 15. The manifold 34 is provided with a peripheral groove 35 and a plurality of radial passages 36 establish communication between the groove 35 and a like number of feeder passages 37. The feeder passages 37 are in substantial registry with the troughs 33.

Water is introduced to the groove 35 through an inlet passage 38 which is connected to the end of a pipe 39. The pipe extends through the hollow interior of the mandrel 10 to the exterior of the apparatus and is connected to a source of supply of water or other flushing medium. Water supplied through pipe 39 passes through inlet passage 38 to groove 35 and then through radial passages 36 and feeder passages 37 to troughs 33.

The flushing water discharged from the forward end of troughs 33 passes through opening 40 in head 5 and is collected in a suitable sump, not shown.

The pipe 1 is guided for movement within the sizing apparatus by a pair of guides 41 and 42 which are located at opposite ends of the apparatus. The guide 41 is secured to the outer surface of the forward cylinder head 5 by a series of bolts 43 and is provided with a central tapered flange 44 which defines an axial opening 45 to receive the pipe 1. The axial opening 45 has a diameter slightly greater than the pipe and is in alignment with the axis of the die assembly 17.

The rear guide 42 is secured to the outer end of mandrel 10 by bolts 46, and the guide is provided with a central flange 47 which extends inwardly within the hollow interior of mandrel 10. The guide 42 is provided with a central opening 48 which is in axial alignment with the opening 45 in guide 41. As the guides 41 and 42 are disposed at opposite ends of the apparatus, the portion of the pipe extending between the guides is maintained in alignment with the die assembly and the pipe will not bend or warp during the sizing operation.

To reciprocate piston 9 within cylinder 2 and thereby expand and contract the die assembly, hydraulic fluid is introduced into the ends of the cylinder. A passage 49 is formed in the rear head 6 and establishes communication between the exterior and the rearward end of cylinder 2. In a similar manner, a passage 50 is formed in the wall of the cylinder 2 and provides communication between the forward end of the cylinder and the exterior.

Pipes 51 and 52 connect the passages 49 and 50 respectively, to a variable delivery reversible pump 53, shown diagrammatically in FIG. 8, which serves to draw fluid from one end of the cylinder through pipes 51 or 52 and pump it under pressure through the other pipe to the opposite end of the cylinder to thereby move the piston 9. The pipes 51 and 52 are secured in communication with the respective passages 49 and 50 by means of a ring 54 which is secured within a shoulder formed in the end of the pipe and is secured to the cylinder head 6 and cylinder wall 2, respectively, by bolts 55.

By introducing hydraulic fluid into passage 49, the piston 9 is moved forwardly to thereby compress the die assembly and force the die segments 18 against the outer surface of the pipe 1 to size the same. To release the die segments from engagement with the pipe, hydraulic fluid is introduced into the cylinder through passage 50. The fluid moves the piston 9 rearwardly in the cylinder and thereby correspondingly moves the mandrel rearwardly to open the die assembly and move the die segments out of engagement with the pipe 1. The pipe 1 can then be advanced within the apparatus so that a second unexpanded portion of the pipe is disposed within the die assembly. The procedure is repeated with hydraulic fluid again being introduced through passage 49 to the cylinder to affect the compression stroke and size the length of the pipe disposed within the die assembly.

Rotation of the mandrel 10 with respect to the cylinder 2, is prevented by keying the mandrel to the cylinder. A radially extending key 56 is secured to the end of the cylinder head 6 by bolts 57. The key 56 is disposed within a radially extending recess 58 formed in the forward face of key ring 59. The key ring 59, in turn, is keyed to the mandrel by a key 60. The key 60 is secured to the inner surface of key ring 59 by bolts 61 and is received within a longitudinal slot 62 formed in the outer surface of mandrel 10. The keys 56 and 60 and the cooperating keyways prevent relative rotation between the mandrel and the cylinder 2.

The sizing of the pipe is controlled by a series of limit switches which are actuated by movement of the mandrel. As shown in FIGURES 1 and 6, a plate 63 is secured by suitable bolts to the end of the mandrel and a rod 64 is secured to the lower end of plates 63 and extends beneath the cylinder head 6. The plate 63 and rod 64 move with the mandrel 10 and the rod 64 is journaled for reciprocating movement within bearing 65 which is attached to plate 66. The plate 66 is secured to the outer surface of cylinder head 6.

A pair of limit switches 67 and 68 are secured to the plate 66 and are provided with roller arms 69 and 70. The roller arms 69 and 70 of the limit switches are adapted to be alternately engaged by dogs 71 and 72 which are adjustably secured to the rod 64. As best shown in FIG. 6, the dogs 71 and 72, which are secured to rod 64, move with the reciprocating movement of the mandrel and engage the roller arms 69 and 70, respectively. The limit switches 67 and 68 are connected to the reversible pump 53 which controls the operation of hydraulic fluid to the cylinder.

At the end of the compression stroke of the piston and mandrel, the dog 71 engages the roller arm 69 of limit switch 67 to reverse the motor of pump 53 and thereby reverse the flow of fluid. The fluid is then drawn from the rear end of cylinder 2, through passage 49 and pipe 51 to the pump 53 and forced through pipe 52 and passage 50 to the forward end of the cylinder to thereby move the piston 9 rearwardly and expand the die assembly.

The pipe 1 is advanced forwardly in the apparatus during the retraction stroke to position a second length of the pipe within the die assembly in position to be sized by the next compression stroke. At the end of the retraction stroke, the dog 72 engages roller arm 70 of limit switch 68 to again reverse the motor of pump 53 and reverse the flow of fluid to cylinder 2 and move the piston forwardly in a compression stroke.

By adjusting the location of dog 71 on rod 64, the length of the compression stroke can be varied and thus the magnitude of sizing or compression of the pipe can be altered.

A mechanical safety feature is provided which prevents over-compression of the pipe by limiting the compression stroke of the piston and mandrel in the event of a malfunction of the limit switch 67. The safety feature is brought about by a nut 73 which is threaded onto the rear end of mandrel 10. The nut 73 is adjustable on the mandrel and moves with the mandrel during the compression and retraction strokes. To limit the forward movement of the mandrel, the forward surface 74 of nut 73 is adapted to engage the rearward surface 75 of key ring 59 on the compression or forward stroke. The position of nut 73 is adjusted on the mandrel so that the engagement of surfaces 74 and 75 is adapted to occur immediately after the engagement of dog 71 with arm 69 of limit switch 67, so if for some reason the limit switch is not actuated or fails to respond, the compression stroke will be stopped and the pipe will not be crushed. The stop provided by the nut 73 and key ring 59 serves as an auxiliary safety feature which prevents excessive compression should the electrical or hydraulic systems fail or be defective.

The surfaces of both the radial keys 28 and longitudinal keys 19 may be formed with a plurality of recesses or grooves which serve to retain a lubricating medium. The lubricating medium may be introduced within the keyed surfaces to reduce the sliding friction therebetween and the resulting heat generation during the sizing operation.

The pipe 1 to be reduced in diameter or sized is introduced into the apparatus either manually or by a suitable automatic conveyor mechanism. To begin operation, hydraulic fluid is introduced through passage 50 to the cylinder 2 to move the piston 9 rearwardly and expand the die assembly. The pipe is then introduced within the apparatus to a position where the leading end of the pipe is substantially flush with the forward end of the die assembly. With the pipe in this position, hydraulic fluid is then introduced into the passage 49 to cylinder 2 to compress the die assembly and force the die segments 18 inwardly against the outer surface of the pipe.

As previously pointed out, the magnitude of the compression stroke is limited by the engagement of dog 71 with the limit switch roller arm 69 and this serves to accurately determine the degree of compression to which the pipe is subjected and thereby results in a very accurately sized pipe of uniform diameter. At the end of the compression stroke, the dog 71 strikes the limit switch roller arm 69 to reverse the flow of fluid within the cylinder. The piston is then moved rearwardly within the cylinder to expand the die assembly and during this rearward movement the pipe is advanced forwardly an increment of length to position a second section of the pipe within the die assembly. In advancing the pipe, a small portion of overlap is provided so as to insure a uniformly sized pipe throughout the length.

The process is repeated with the second length of the pipe located within the die assembly being sized by contraction of the die assembly. The die assembly is again expanded and the pipe is then advanced to position the next succeeding length within the die assembly and this process is repeated until the entire length of the pipe has been cold sized.

FIG. 9 shows a modified form of the sizing apparatus. In this embodiment, the ends of cylinder 76 are enclosed by heads 77 and 78 which correspond generally to heads 5 and 6 of the first embodiment. A piston 79, which corresponds generally to piston 9, is slidably disposed within the cylinder 76 and is formed integrally with hollow mandrel 80. An annular mandrel extension 81 is secured to the rear end of mandrel 80 by bolts 82 which extend through with flange 83 of extension 81 and are threaded into the mandrel.

The mandrel 80 is guided in longitudinal movement by a pair of bearing assemblies 84, similar in structure and function to bearing assemblies 11 and 12, and which are secured within recesses in the cylinder 76 and head 78, respectively, by retaining rings 85.

As in the first embodiment, the inner surface of mandrel 80 is tapered to provide a wedge which acts against the outer tapered surface of the annular die assembly 86 to expand or contract the same. The die assembly is formed of a series of die segments 87 which correspond to die segments 18 of the first embodiment.

To prevent rotation of the die segments, a key 88 is attached to the outer surface of each die segment 87 and cooperates with a keyway 89 formed in guide block 90 secured to the inner surface of mandrel 80.

To prevent relative longitudinal movement between the guide blocks 90 and the mandrel 80, the guide blocks are secured between the flange 83 of mandrel extension 81, which bears against the rear end of the guide blocks, and a retaining ring 91 which is secured to the forward end of the mandrel and bears against the forward end of the guide blocks.

To guide the die segments 87 in radial movement and to prevent the die segments from moving axially with the mandrel, a pair of rings 93 and 94 bear against the ends of the die assembly. The ring 93 is secured by bolts 95 to the inwardly extending annular flange 96 of head 77 and bears against the forward end of the die assembly 87. The ring 94 bears against the rear end of the die assembly and is provided with an outwardly extending flange 97 which is received within a recess 98 formed in the inwardly extending flange 99 of annular cap 100. The cap 100 is also provided with an outwardly extending flange 101 which is secured to the end of head 78 by bolts 102.

The retaining rings 93 and 94 guide the die segments 87 in radial movement during the expansion and contraction of the die assembly. In addition, there is a tendency for the die segments to move rearwardly with the mandrel on the return stroke of the piston and this tendency is prevented by the ring 94.

Foreign material is flushed from the die segments in a manner similar to that described in the first embodiment. The flushing water is introduced to the apparatus through a tube 103 which communicates with a peripheral groove 104 formed in the flange 97 of ring 94. A series of radial passages 105 provide communication between the groove 104 and a corresponding number of feeder passages 106 which register with the troughs 107 formed in the mandrel 80.

The flushing water, after passing through troughs 107 in the lower portion of the mandrel 80, passes through grooves 108 in ring 91 and is collected in a suitable sump.

The pipe 1 is guided in movement through the apparatus by a pair of guide rings 109 and 110 which are located at opposite ends of the apparatus. The guide rings 109 and 110 are provided with axial openings which are in alignment with each other and which are also in alignment with the axis of the die assembly 86.

The guide ring 109 is secured within a suitable recess in head 77 by a retaining ring 111, while the guide ring 110 is secured within a recess formed in the cap 100 by a similar retaining ring 112.

The piston 79 is reciprocated within the cylinder 76 by hydraulic fluid which is introduced into the ends of the cylinder by conduits 113 and 114 which communicate with passages 115 and 116, corresponding generally to passages 49 and 50 of the first embodiment.

To prevent rotation of the mandrel 80 and piston 79 with respect to the cylinder 76, the mandrel is keyed to the cap 100. This is accomplished by securing a key 117 within recess 118 formed in cap 100 by bolts 119. The key 117 cooperates with keyway 120 formed in the inner surface of mandrel extension 81 to prevent relative rotation between the members.

The reciprocating action of the piston is controlled by a pair of limit switches 121 which are actuated by the reciprocating movement of the piston and mandrel, in a manner similar to that described with respect to the first embodiment. The limit switches 121 are secured to a bracket 122 attached to cap 100 and are actuated by adjustable dogs 123 attached to rod 124. The rod 124 is secured to the mandrel extension 81 and moves with the reciprocation of the piston to cause the dogs 123 to actuate the respective limit switches 121 in the manner previously described.

To prevent over-compression of the pipe in the event of failure of the electrical control system, a mechanical stop is provided. The stop takes the form of plugs 125 which is threaded into an opening in head 77 and is adapted to be engaged by the ring 91 in the event the compression stroke of the piston is not stopped by the electrical control system. By threaded adjustment of the plug 125 within the opening, the position of the stop can be varied and the degree of compression of the pipe can be changed.

The present sizing apparatus provides a very accurate and controlled sizing of the pipe due to the fact that pressure is exerted through each of the die segments which are disposed around the periphery of the pipe. As a more uniform force is applied over the entire periphery of the pipe, a more uniform compression is provided which results in a pipe having better mechanical properties and greater dimensional accuracy.

The apparatus is considerably simpler in construction than conventional sizing machines for the only moving parts are the piston and the die segments. By substantially reducing the number of moving parts, the weight of the apparatus is reduced, the initial cost is also reduced and the maintenance expenses are decreased.

As the apparatus of the invention sizes a considerable length of pipe during each compression stroke of the piston, a straighter pipe will result over that in which the pipe is sized by rolls which act essentially through a line contact with the pipe. In addition to the large area over which the apparatus works, the pipe is held in axial alignment with the die assembly by means of the pipe guides located at opposite ends of the machine. The guides serve to maintain the pipe in a straight condition in the area therebetween and this further aids in producing a straight uniformly sized pipe.

While the above description is directed primarily to the cold sizing of pipe, it is contemplated that the apparatus can be used in any hot or cold working operation for reducing the diameter of a tubular article.

Various modes of carrying out the invention are contemplated as being within the scope of the following claims particularly pointing out and distinctly claiming the subject matter which is regarded as the invention.

I claim:

1. An apparatus for cold sizing a tubular article, comprising an annular die assembly having an axial opening to receive the article to be sized and being formed of a plurality of circularly disposed radially-movable die segments, each of said die segments being tapered in an axial direction and having a generally flat outer surface, a hollow mandrel disposed around the die assembly and having a generally polygonal inner surface tapered to complement the tapered outer surfaces of the die segments, key means for preventing relative rotation between the mandrel and the die segments, trough means formed in the inner surface of the mandrel and disposed in substantial registry with the joints between adjacent die segments for conducting a flushing medium through the apparatus, means for introducing a flushing medium into said trough means to flush foreign material therefrom, a hollow piston disposed around the mandrel and connected directly thereto, a cylinder slidably containing the piston, means for alternately introducing hydraulic fluid into opposite ends of the cylinder to reciprocate the piston with movement of the piston in one direction forcing the die segments radially inward against the pipe to size the same and movement of the piston in the opposite direction expanding the die segments out of contact with the pipe after sizing to permit advancement of the pipe through the die assembly, and means for guiding the die segments in radial movement and for preventing axial movement of the die segments with the mandrel.

2. An apparatus for cold sizing a tubular article, comprising an annular die assembly having an axial opening to receive the article to be sized and being formed of a plurality of circularly disposed radially movable die segments, each of said die segments being tapered in an axial direction and having a generally flat outer surface, a hollow mandrel disposed around the die assembly and having a generally polygonal inner surface tapered to complement the tapered outer surfaces of the die segments, said inner surface of the mandrel being formed with a series of longitudinally extending grooves disposed in substantial alignment with the joints between adjacent die segments, means for introducing a flushing medium into each of said grooves to flush foreign material therefrom, a hollow piston disposed around the mandrel and connected directly thereto, a cylinder slidably containing the piston, means for alternately introducing hydraulic fluid into opposite ends of the cylinder to reciprocate the piston with movement of the piston in one direction forcing the die segments radially inward against the pipe to size the same and movement of the piston in the opposite direction expanding the die segments out of contact with the pipe after sizing to permit advancement of the pipe through the die assembly, and means for guiding the die segments in radial movement and for preventing axial movement of the die segments with the mandrel.

3. An apparatus for sizing pipe, comprising a cylinder having openings in opposite ends thereof to receive the pipe to be sized, a hollow piston slidably disposed within the cylinder and having a generally tapered inner surface, an annular die assembly disposed within the piston and having a tapered outer surface to complement the tapered inner surface of the piston, said die assembly having a central opening disposed in axial alignment with the openings in the cylinder to receive the pipe to be sized and said die assembly being formed of a series of circumferentially disposed radially expandable die segments, supply means for alternately supplying hydraulic fluid to opposite ends of the cylinder to reciprocate the piston therein, means responsive to a given amount of compression of the pipe for reversing said supply means and supplying hydraulic fluid to the opposite end of the cylinder to reverse the piston movement and expand the die assembly out of contact with the pipe to permit advancement of the pipe through the apparatus.

4. An apparatus for sizing pipe, comprising a cylinder having openings in opposite ends thereof to receive the pipe to be sized, a hollow piston slidably disposed within the cylinder and having a generally tapered inner surface, an annular die assembly disposed within the piston and having a tapered outer surface to complement the tapered inner surface of the piston, said die assembly having a central opening disposed in axial alignment with the openings in the cylinder to receive the pipe to be sized and said die assembly being formed of a series of circumferentially disposed radially expandable die segments, conduit means communicating with each end of the cylinder for supplying hydraulic fluid to the respective ends of the cylinder to reciprocate the piston therein, valve means disposed in said conduit means for controlling the flow of fluid therein, and means responsive to a given amount of movement of the piston in one direction for actuating said valve means and supplying fluid to the opposite end of the cylinder to reverse the stroke of the piston.

5. An apparatus for sizing pipe, comprising a cylinder having openings in opposite ends thereof to receive the pipe to be sized, a hollow piston slidably disposed within the cylinder and having a generally tapered inner surface, an annular die assembly disposed within the piston and having a tapered outer surface to complement the tapered inner surface of the piston, said die assembly having a central opening disposed in axial alignment with the openings in the cylinder to receive the pipe to be sized and said die assembly being formed of a series of circumferentially disposed radially expandable die segments, means for introducing hydraulic fluid into the cylinder to move the piston axially therein and thereby force the die segments radially inward against the pipe to size the same, electrical control means for controlling the operation of the fluid supply means and providing a given amount of radially inward movement of the die segments to effect a given compression of the pipe, and mechanical stop means disposed to be engaged by said piston to prevent over-compression of said pipe in the event of failure of the electrical control means.

6. An apparatus for cold sizing pipe, comprising a cylinder, a first head enclosing an end of said cylinder, a second head enclosing the opposite end of said cylinder, said heads having aligned openings therethrough, a hollow piston disposed within the cylinder, an annular mandrel connected to the inner surface of said piston, said mandrel having a tapered inner surface disposed within the cylinder and having an end extending outwardly through said first head, an annular die assembly disposed within the mandrel and having a tapered outer surface to complement the tapered surface of the mandrel, said die assembly having a central opening to receive the pipe to be sized and being formed of a series of circumferentially disposed radially expandable die segments, means interconnecting said tapered die surfaces for preventing rotation of the die segments with respect to the mandrel, means for guiding the die segments in radial movement and for preventing axial movement of the segments with the mandrel, a first guide member connected to said end of the mandrel and being spaced axially from said die assembly, a second guide member connected to said second head and being spaced axially of said die assembly, said first and second guide members receiving the pipe and preventing bending and warping of the pipe being sized within said die assembly, and means for alternately introducing fluid pressure into opposite ends of the cylinder to reciprocate the piston with movement of the piston in one direction forcing the die segments radially inward against the pipe to size the same and movement of the piston in the opposite direction expanding the die segments out of contact with the pipe after sizing to permit advancement of the pipe through the die assembly.

7. An apparatus for sizing pipe, comprising a cylinder having openings in opposite ends thereof to receive the pipe to be sized, a hollow piston slidably disposed within the cylinder and having a generally tapered inner surface, an annular die assembly disposed within the piston and having a tapered outer surface to complement the tapered inner surface of the piston, said die assembly having a central opening disposed in axial alignment with the openings in the cylinder to receive the pipe to be sized and said die assembly being formed of a series of circumferentially disposed die segments with each die segment being uniformly slidable in a radial direction throughout its entire length, means for supplying hydraulic fluid to the opposite ends of the cylinder to reciprocate the piston therein and force the die segments radially inwardly against the pipe to size the same during one stroke of reciprocation of the piston, and means connected to opposite ends of the cylinder for engaging the corresponding ends of the die segments, said last named means disposed to guide the die segments in radial movement and prevent axial movement of said segments with movement of the piston.

References Cited in the file of this patent
UNITED STATES PATENTS

| | | |
|---|---|---|
| 1,536,413 | Thrift | May 5, 1925 |
| 1,872,067 | Furrer | Aug. 16, 1932 |
| 2,054,375 | Halle | Sept. 15, 1936 |
| 2,109,546 | McLagan | Mar. 1, 1938 |
| 2,114,171 | Benbow | Apr. 12, 1938 |
| 2,174,970 | Cornell | Oct. 3, 1939 |
| 2,372,592 | Lovely | Mar. 27, 1945 |
| 2,382,359 | Weightman | Aug. 14, 1945 |
| 2,438,999 | Hartley | Apr. 6, 1948 |
| 2,504,186 | De Munck | Apr. 18, 1950 |
| 2,573,166 | Sundt | Oct. 30, 1951 |
| 2,594,028 | Johansen | Apr. 22, 1952 |
| 2,730,331 | Harinck | Jan. 10, 1956 |
| 2,800,943 | Fuchs et al. | July 30, 1957 |
| 2,828,538 | Darden | Apr. 1, 1958 |
| 2,864,623 | Spink | Dec. 16, 1958 |